United States Patent
Narayanaswamy

(10) Patent No.: US 10,937,005 B1
(45) Date of Patent: *Mar. 2, 2021

(54) WEB-ENABLED CHAT CONFERENCES AND MEETING IMPLEMENTATIONS

(71) Applicant: 8x8, Inc., San Jose, CA (US)

(72) Inventor: Ramprakash Narayanaswamy, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,537

(22) Filed: Dec. 31, 2019

Related U.S. Application Data

(63) Continuation of application No. 15/882,705, filed on Jan. 29, 2018, now Pat. No. 10,528,922, which is a continuation of application No. 14/562,862, filed on Dec. 8, 2014, now Pat. No. 9,881,282, which is a continuation of application No. 12/646,604, filed on Dec. 23, 2009, now Pat. No. 8,914,734.

(51) Int. Cl.
| | | |
|---|---|---|
| *G06Q 10/10* | (2012.01) | |
| *H04L 12/18* | (2006.01) | |
| *H04M 3/56* | (2006.01) | |
| *H04L 29/06* | (2006.01) | |
| *H04L 29/08* | (2006.01) | |
| *H04N 7/15* | (2006.01) | |

(52) U.S. Cl.
CPC ..... *G06Q 10/1095* (2013.01); *H04L 12/1818* (2013.01); *H04L 65/403* (2013.01); *H04L 67/02* (2013.01); *H04M 3/56* (2013.01); *H04N 7/15* (2013.01); *H04M 2207/20* (2013.01)

(58) Field of Classification Search
CPC .................................................. G06Q 10/1095
USPC .......................................................... 715/751
See application file for complete search history.

(56) References Cited

U.S. PATENT DOCUMENTS

| | | |
|---|---|---|
| 3,873,771 A | 3/1975 | Kleinerman et al. |
| 3,937,878 A | 2/1976 | Judice |
| 4,099,202 A | 7/1978 | Cavanaugh |
| 4,237,484 A | 12/1980 | Brown et al. |
| 4,485,400 A | 11/1984 | Lemelson et al. |
| 4,521,806 A | 6/1985 | Abraham |

(Continued)

FOREIGN PATENT DOCUMENTS

| | | |
|---|---|---|
| DE | 3640680 | 6/1988 |
| GB | 2173675 A | 10/1986 |

(Continued)

*Primary Examiner* — William D Titcomb
(74) *Attorney, Agent, or Firm* — Crawford Maunu PLLC

(57) ABSTRACT

Meeting and conferencing systems and methods are implemented in a variety of manners. Consistent with an embodiment of the present disclosure, a meeting system is implemented via a computer server which is configured to provide a web-based meeting-group subscription option to potential meeting participants. A meeting scheduling data is received over a web-accessible virtual meeting interface. The meeting scheduling data includes group identification information and meeting time information. In response to the group identification information, participant identification information is retrieved for participants that subscribe to a meeting group identified by the group identification information. Chat sessions may be used by the meeting participants.

19 Claims, 13 Drawing Sheets

(56) References Cited

U.S. PATENT DOCUMENTS

| | | |
|---|---|---|
| 4,544,950 A | 10/1985 | Tu |
| 4,593,318 A | 6/1986 | Eng et al. |
| 4,715,059 A | 12/1987 | Cooper-Hart et al. |
| 4,725,897 A | 2/1988 | Konishi |
| 4,766,499 A | 8/1988 | Inuzuka |
| 4,774,574 A | 9/1988 | Daly et al. |
| 4,780,757 A | 10/1988 | Bryer et al. |
| 4,780,758 A | 10/1988 | Lin et al. |
| 4,789,895 A | 12/1988 | Mustafa et al. |
| 4,829,372 A | 5/1989 | McCalley et al. |
| 4,831,438 A | 5/1989 | Bellman, Jr. et al. |
| 4,837,798 A | 6/1989 | Cohen et al. |
| 4,849,811 A | 7/1989 | Kleinerman |
| 4,888,638 A | 12/1989 | Bohn |
| 4,905,315 A | 2/1990 | Solari et al. |
| 4,924,303 A | 5/1990 | Brandon et al. |
| 4,943,994 A | 7/1990 | Ohtsuka et al. |
| 4,955,048 A | 9/1990 | Iwamura et al. |
| 4,962,521 A | 10/1990 | Komatsu et al. |
| 4,963,995 A | 10/1990 | Lang |
| 4,967,272 A | 10/1990 | Kao et al. |
| 4,985,911 A | 1/1991 | Emmons et al. |
| 4,991,009 A | 2/1991 | Suzuki et al. |
| 5,016,107 A | 5/1991 | Sasson et al. |
| 5,073,926 A | 12/1991 | Suzuki et al. |
| 5,130,792 A | 7/1992 | Tindell et al. |
| 5,136,628 A | 8/1992 | Araki et al. |
| 5,150,211 A | 9/1992 | Charbonnel et al. |
| 5,164,980 A | 11/1992 | Bush et al. |
| 5,170,427 A | 12/1992 | Guichard et al. |
| 5,231,483 A | 7/1993 | Sieber et al. |
| 5,268,734 A | 7/1993 | Parker et al. |
| 5,276,866 A | 1/1994 | Paolini |
| 5,280,530 A | 1/1994 | Trew et al. |
| 5,339,076 A | 8/1994 | Jiang |
| 5,341,167 A | 8/1994 | Guichard et al. |
| 5,347,305 A | 8/1994 | Bush et al. |
| 5,379,351 A | 1/1995 | Fandrianto et al. |
| 5,384,594 A | 1/1995 | Sieber et al. |
| 5,400,068 A | 3/1995 | Ishida et al. |
| 5,410,326 A | 4/1995 | Goldstein |
| 5,430,809 A | 7/1995 | Tomitaka |
| 5,432,597 A | 7/1995 | Parker et al. |
| 5,471,296 A | 11/1995 | Parker et al. |
| 5,495,284 A | 2/1996 | Katz |
| 5,539,452 A | 7/1996 | Bush et al. |
| 5,559,551 A | 9/1996 | Sakamoto et al. |
| 5,561,518 A | 10/1996 | Parker et al. |
| 5,568,185 A | 10/1996 | Yoshikazu |
| 5,570,177 A | 10/1996 | Parker et al. |
| 5,572,317 A | 11/1996 | Parker et al. |
| 5,572,582 A | 11/1996 | Riddle |
| 5,574,964 A | 11/1996 | Hamlin |
| 5,587,735 A | 11/1996 | Ishida et al. |
| 5,594,813 A | 1/1997 | Fandrianto et al. |
| 5,619,265 A | 4/1997 | Suzuki et al. |
| 5,640,195 A | 6/1997 | Chida |
| 5,657,246 A | 8/1997 | Hogan et al. |
| 5,675,375 A | 10/1997 | Riffee |
| 5,677,727 A | 10/1997 | Gotoh et al. |
| 5,722,041 A | 2/1998 | Freadman |
| 5,835,126 A | 11/1998 | Lewis |
| 5,901,248 A | 5/1999 | Fandrianto et al. |
| 5,905,942 A | 5/1999 | Stoel et al. |
| 5,978,014 A | 11/1999 | Martin et al. |
| 6,026,097 A | 2/2000 | Voois et al. |
| 6,104,334 A | 8/2000 | Allport |
| 6,124,882 A | 9/2000 | Voois et al. |
| 6,441,842 B1 | 8/2002 | Fandrianto et al. |
| 6,526,581 B1 | 2/2003 | Edson |
| 6,611,537 B1 | 8/2003 | Edens et al. |
| 7,065,709 B2 | 6/2006 | Ellis et al. |
| 7,394,803 B1 | 7/2008 | Petit-Huguenin et al. |
| 7,801,971 B1 | 9/2010 | Amidon et al. |
| 8,332,470 B2 | 12/2012 | Arun et al. |
| 8,346,864 B1 | 1/2013 | Amidon et al. |
| 2002/0054601 A1 | 5/2002 | Barraclough et al. |
| 2005/0034079 A1 | 2/2005 | Gunasekar |
| 2005/0254440 A1 | 11/2005 | Sorrell |
| 2006/0053380 A1 | 3/2006 | Spataro et al. |
| 2009/0046139 A1 | 2/2009 | Cutler et al. |
| 2009/0048892 A1 | 2/2009 | Harms |
| 2009/0234721 A1 | 9/2009 | Bigelow et al. |
| 2009/0249244 A1 | 10/2009 | Robinson et al. |
| 2010/0082369 A1 | 4/2010 | Prenelus et al. |
| 2010/0125353 A1 | 5/2010 | Petit-Huguenin |
| 2010/0162365 A1 | 6/2010 | Del Real |
| 2010/0223157 A1 | 9/2010 | Kalsi |
| 2011/0040834 A1* | 2/2011 | Schaefer ............. G06Q 10/109 709/204 |
| 2011/0052155 A1 | 3/2011 | Desmarais et al. |
| 2011/0107236 A1* | 5/2011 | Sambhar ............. H04L 12/1827 715/753 |
| 2011/0149809 A1 | 6/2011 | Narayanaswamy |
| 2011/0149811 A1 | 6/2011 | Narayanaswamy |

FOREIGN PATENT DOCUMENTS

| | | |
|---|---|---|
| JP | 61159883 | 7/1986 |
| JP | 1175452 | 7/1989 |
| JP | 403229588 A | 10/1991 |
| JP | 9149333 | 6/1997 |
| WO | 9110324 | 7/1991 |

\* cited by examiner

WEB-ENABLED CHAT CONFERENCES AND MEETING IMPLEMENTATIONS

RELATED DOCUMENTS

This patent document is a continuation under 35 U.S.C. § 120 of U.S. patent application Ser. No. 15/882,705 filed on Jan. 29, 2018 (U.S. Pat. No. 10,528,922), which is further a continuation of U.S. patent application Ser. No. 14/562,862 filed on Dec. 8, 2014 (U.S. Pat. No. 9,881,282), which is further a continuation of U.S. patent application Ser. No. 12/646,604 filed on Dec. 23, 2009 (U.S. Pat. No. 8,914,734); each of these patent document is fully incorporated herein by reference.

FIELD OF THE INVENTION

The present invention relates generally to conferencing and meeting mechanisms and to systems, methods and devices for facilitating meetings conducted using data shared over the Internet.

BACKGROUND

The ability to conduct productive and efficient meetings can be an important aspect of the success of the related endeavor, whether the endeavor is business, learning or otherwise. The ability to easily convey different types of information in an effective manner to and between participants is paramount to the success of a meeting. Keeping meetings productive and efficient is difficult enough when each of the participants is physically at the same location. Many meetings, however, include at least one participant from a remote location. In extreme cases, the entire meeting can consist of remote participants. Remote conferences present a host of issues in addition to those issues that present themselves in an in-person meeting.

A number of remote meeting solutions attempt to address one or more of these issues. Telephone conferencing allows multiple participants to speak with one another. Computer applications allow remote participants to view slides, shared applications and other data. Coordination of meeting times and connection information is sometimes implemented using calendaring software and/or email. These and other solutions, however, are often frustrated by a vast array of different meeting requirements. These requirements include types of data to be shared, coordination of participants from different locales, different relationships between participants, technology capabilities of devices used to share meeting data, technical prowess of the participants and other aspects.

SUMMARY

Aspects of the present disclosure are directed to remote meeting solutions that address challenges including those discussed above, and that are applicable to a variety of web-sharing applications, devices, systems and methods. These and other aspects of the present invention are exemplified in a number of implementations and applications, some of which are shown in the figures and characterized in the claims section that follows.

Consistent with an embodiment of the present disclosure, a meeting system is implemented that includes a computer server arrangement with at least one processor. The computer server arrangement is configured to provide a web-based meeting-group subscription option to potential meeting participants. A meeting scheduling data is received over a web-accessible virtual meeting interface. The meeting scheduling data includes group identification information and meeting time information. In response to the group identification information, participant identification information is retrieved for participants that subscribe to a meeting group identified by the group identification information. In response to the meeting time information and the participant identifying information, chat connections or sessions can be established for participants of the meeting.

Consistent with another embodiment of the present disclosure, a meeting system is implemented that includes a computer server arrangement. The computer server arrangement includes at least one processor and is configured to receive, from a social website, meeting scheduling data from the virtual meeting interface, the meeting scheduling data including participant identification information and meeting time information. A web-accessible virtual meeting interface is provided. Participant identification information is retrieved for participants identified by the participant identification information.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which:

FIG. 4 depicts a user interface that relates to selection of meeting details, consistent with an embodiment of the present disclosure;

FIG. 5 depicts a user interface that relates to setting of meeting options, consistent with an embodiment of the present disclosure;

FIG. 6 depicts a user interface that relates to selection of dial in meeting number(s), consistent with an embodiment of the present disclosure;

FIG. 7 depicts a user interface that provides for the addition of participants and the selection of a host and a moderator, consistent with an embodiment of the present disclosure;

Figure 1:
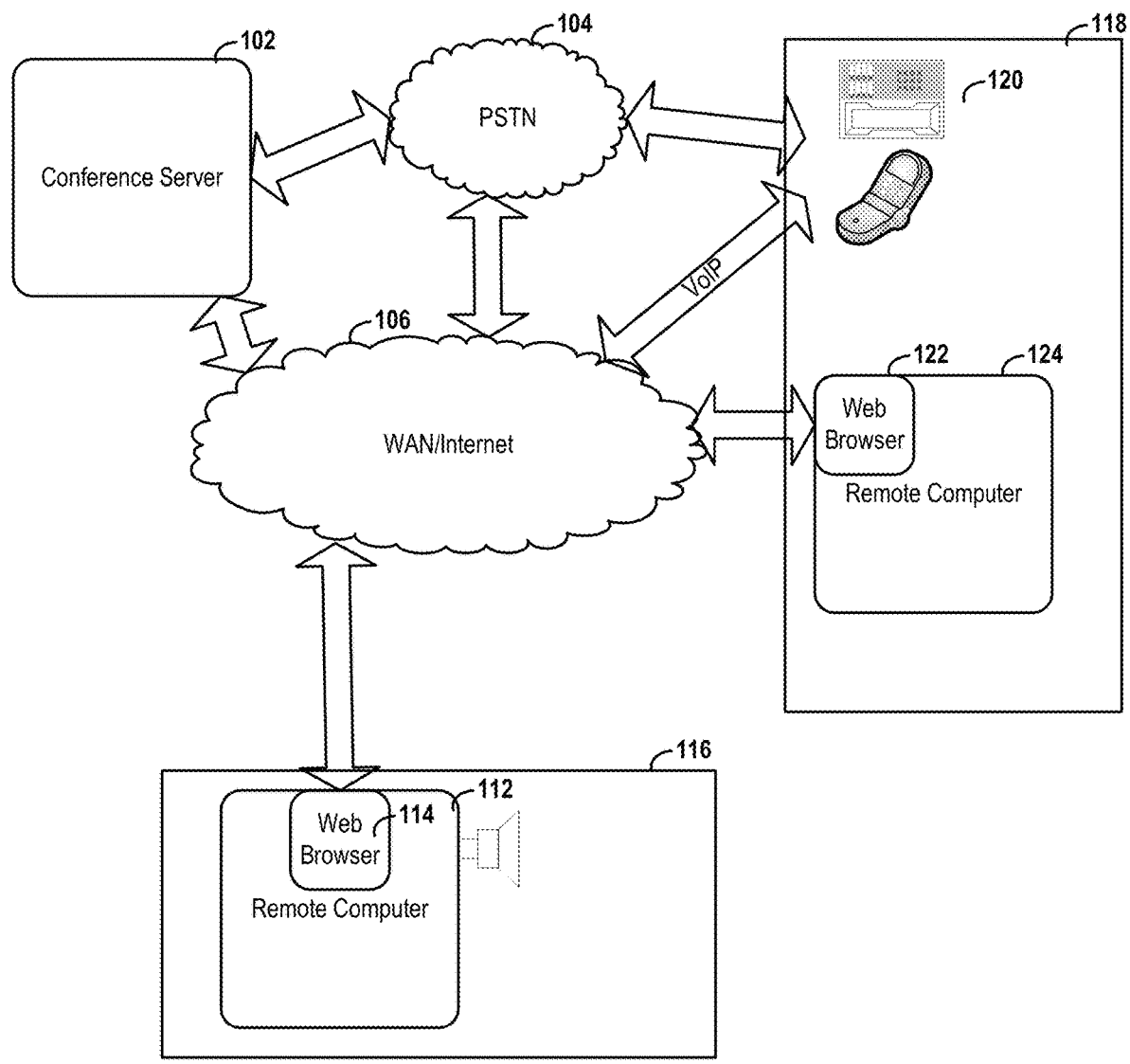
FIG. 1 depicts a virtual meeting system diagram consistent with an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure are directed to remote meetings and related approaches, their uses and systems for the same. While the present invention is not necessarily limited to such applications, various aspects of the invention may be appreciated through a discussion of various examples using this context.

The present disclosure includes a discussion of meeting/conferencing solutions that are collectively referred to as a "virtual meeting" solution. The term virtual meeting implies that the participants are virtually attending by virtue of the physical absence from a central meeting location; however, the present disclosure is not so limited. Indeed various aspects of the present disclosure can be implemented with all meeting participants located within the same room.

Embodiments of the present disclosure relate to a virtual meeting solution that provides a number of meeting features to users of web-browsing applications (e.g., Microsoft's Internet Explorer®, Firefox®, Google's Chrome and Apple's Safari®). Particular implementations afford the participants the meeting features as part of a solution that runs within the browsers (e.g., in the absence of locally installed applications or plug-ins). Other aspects relate to allowing users to establish a meeting, start a meeting and/or join a meeting by selection of a single icon (e.g., one click of mouse).

Consistent with other embodiments of the present disclosure, the virtual meeting solution facilitates establishing telephonic communications with participants. The telephonic communications can include, without limitation, calling participants using landline/Public-Switched-Telephone Network (PSTN) connections, cellular connections, Voice-over-Internet Protocol (VoIP) connections, streaming video feeds and combinations thereof. Specific implementations allow the dialing times for the participants to be scheduled ahead of time according to the meeting start time or other criteria. Aspects of the virtual meeting solution allow the dial times to be controlled in a variety of different manners. For instance, the participants can select the time they wish to be called. Another option allows the meeting organizer to specify the call times for one or more of the participants.

In certain implementations the virtual meeting solution implements a call-profile to contact meeting participants. One aspect of the call-profile includes auto-retry parameters that can be implemented in the event that a dial-out attempt fails to reach a particular participant. These auto-retry parameters can include the interval between retries, the number of retries and alternate numbers to call. The alternate call numbers can be implemented as call-preference order that the virtual meeting traverses when attempting to contact a participant. Other aspects of the call-profile can indicate the best number to reach a particular participant as a function of time, type of meeting or other factors.

Embodiments of the present disclosure also relate to aspects relating to giving meeting participants the ability to dynamically select other participants that are to be contacted. The virtual meeting solution automatically calls the selected participants to add them to the ongoing meeting. This allows for a meeting to grow naturally by adding participants as necessary without requiring contacting the participant in some other manner to have them call into the meeting. In certain implementations, the called party is absolved from having to enter a pass code. The meeting can remain relatively secure by using the called number as a confirmation of the caller's identity. The virtual meeting is particularly powerful in that it provides for International calling of participants.

While not limited thereto, the virtual meeting solution can be used as an enhanced telephone service. In this regard, an individual can use the virtual meeting solution to call individuals and talk using voice communications only; however, the virtual meeting solution allows for the individuals to use the various other data sharing and participant adding features at any point in the conversation. As such, the virtual meeting solution can be particularly useful for impromptu meetings and/or sharing of data between individuals on a telephone call.

Aspects of the present disclosure relate to the use of a virtual meeting solution that coordinates voice data to and from the multiple distributed call points within a single meeting. This coordination can be implemented, for instance, using VoIP services so as to control long-distance-type fees. Aspects of the present disclosure use various quality of service (QoS), quality of experience (QoE) and/or monetary cost considerations to determine the preferred calling solution.

Consistent with one embodiment of the present disclosure, the virtual meeting solution modifies the Caller Id information to provide a called participant with information about the meeting. This information can include the name of the meeting, the purpose of the meeting, the source of the meeting (e.g., hosting business) or connection information useful for accessing the meeting through a web browser.

A particular implementation of the present disclosure relates to a user interface that operates native to a web-browser. Such an implementation allows participants to fully participate in the meeting without first downloading and/or installing customized software. This is particularly useful as participants can be dissuaded from installing such software due to security risks of third-party software. This also lowers the barriers (e.g., for time, effort and technical knowledge) for meeting participants. For instance, a user does not need to install an application for each different computer/device. Moreover, for security reasons many businesses prohibit their employees from installing applications on their computers, thereby introducing another barrier to potential participants. In another instance, plug-ins often cease to work properly when the underlying browser version changes, and thus may require upgrading.

Consistent with an implementation of the present disclosure, the user interface operates native to a web-browser by implementing the meeting/interface functionality within a browser supported coding environment. A specific example is a Flash framework in which a number of applications are written using Flash (e.g., Version-10).

Data transfers from within the web-browser environment can be implemented using a number of suitable transmission techniques and protocols. A few, non-limiting, examples include HTTP/HTTPS transfers as well as RTP, RTSP, RTMP (Real-Time Messaging protocol) and RTMPT (RTMP through HTTP Tunneling).

Aspects of the present disclosure are directed toward sharing participant content. The content sharing can be implemented as files/documents that are accessible from within the web-browser interface. Participants can upload content to be shared with other participants. This uploading can be controlled by the meeting organizer, who has the ability to set upload restrictions as desired.

Another sharing aspect of the present disclosure allows one or more participants to share an active view of their own display screen. For instance, a participant can share his entire desktop, allowing other participants to see everything displayed on his computer screen. This, however, is not always desirable as there may be additional information displayed that is superfluous to the meeting, private to the sharing participant or confidential. Thus, a particular implementation allows for the sharing participant to select specific aspects for sharing. In one instance, the selection can be limited to a particular window or application. In another instance, a customizable floating box/window is provided that can be moved over any portion of the display so as to define the portion that is to be shared. Controls allow for the sharing to be stopped, started and/or paused as desired. In certain implementations of the present disclosure, a participant can relinquish control over a shared document to one or more remote participants. Combinations thereof are also possible, such as limiting sharing to a specific window, further limited by a customizable selection therein.

The present disclosure also relates to efficient and intuitive mechanisms for starting the meeting. In particular implementations, a meeting can be started by clicking on a single icon (e.g., an icon within a calendar displaying the meeting). The meeting starts according to default conditions, preset conditions, prompts for start criteria and/or uses predictive start criteria. The start aspects can include automatic calling of participants, merging of participants into a single teleconference, starting video feed, providing shared documents and/or sharing desktop. This can be particularly useful for reoccurring meetings having similar meeting setup requirements. The virtual meeting solution allows the meeting organizer and participants to specify that the meeting is to be reoccurring and automatically copy startup parameters. The meeting organizer can also select previously defined meeting parameters (e.g., by selecting and copying a prior meeting) when setting up a meeting.

A particular implementation of such a one-click meeting feature allows the participants to first click create the meeting and then to start a created meeting using a single click. Each participant can join the meeting using a single click. The simplicity of such a system is facilitated by the various automated connection and sharing features discussed in more detail herein.

Particular implementations allow a meeting organizer to provide multiple/flexible call-in number for participants. The numbers can be selected based upon telephone-long distance call areas to allow participants to call-in without incurring long distance fees. Other options allow the meeting organizer to specify toll-free numbers or even charge numbers. Yet another possibility is to allow users to connect directly over the Internet (e.g., using VoIP and/or streaming video). This can be implemented using, for instance a computer that has a microphone-speaker combination and access to the Internet, although many other devices provide VoIP-type capabilities.

Aspects of the present disclosure relate to assignable control of various meeting rights to participants by a moderator/meeting owner. The virtual meeting solution can be configured to allow for significant flexibility regarding assignable rights. For instance, a first group of participants can be allowed full audio rights, including the ability to listen and speak as part of the meeting. A second group of participants can be given limited (e.g., listen only) or no audio rights. Other rights include the ability to invite new participants and/or to have participants be called to join the meeting. One or more participants can also be given remote control over another participant's computer allowing them to present shared content therefrom. In a particular implementation, different control profiles can be established for control over a set of such aspects. Participants can then be grouped according to the desired profile. In one instance, this can be implemented by providing a viewable list of participants and the control profiles. A moderator can then move participants into the proper control profile by dragging and dropping the participant into the proper control profile.

Embodiments of the present disclosure relate to audio/video recordings of a meeting session. In one implementation, the recording includes inputs from each of the participants. This can be accomplished by receiving audio/video data streams from each participant and merging them into a single recording. In other instances, input from a subset of participants can be excluded from the recording. The recordings can then be stored for access via a web browser including, but not limited to, a web browser running a version of the virtual meeting solution. The virtual meeting solution can store a link to the meeting in a calendar, allowing a participant to access the recording from a calendar where the meeting was originally scheduled from.

Aspects of the present disclosure relate to interactions between meetings and other applications for communication and/or scheduling. For instance, the virtual meeting solution can be configured to synchronize and otherwise integrate with a number of calendaring solutions including, but not limited to, a Microsoft Exchange server, Google calendar program or other calendaring programs. The virtual meeting solution also handles meeting requests from various sources using, for instance, the iCalendar (.ics) protocol. The invitations can be received as email, hyperlinks, or other mechanisms. A virtual meeting application can be installed to interface with an application programming interface (API) for a particular calendar program. When a meeting is added or otherwise detected the virtual meeting application provides options to setup a virtual meeting using the existing meeting details as the default meeting settings, which can be modified thereafter. Thus, existing meeting participants can be imported into a virtual meeting by uploading to a virtual meeting server hosting the meeting details. This is particularly useful for providing a seamless meeting scheduling between multiple applications.

In one instance, a virtual meeting application accesses contact lists from email, telephone or other programs and adds the contacts to the virtual meeting solution. The contacts can then be used at any location through the web interface.

In other implementations contact lists can be developed using social website lists, such as those provided by Facebook®, Linked-in®, Twitter®, Flixster® or Myspace®. An application exports names and other available information from the social website. Other applications automatically invite members of groups to associate meetings.

One embodiment of the virtual meeting application is implemented with online dating services. A consideration for such services is maintaining a level of anonymity while providing a manner with which potential couples can communicate. For instance, a first participant may wish to speak with another participant before deciding to commit to a date. The dating service provides the name and profile of the participants, but does not disclose the telephone number. Nevertheless, the virtual meeting application can be used to call one of the participants. Unlike various other implementations discussed herein, the actual telephone number is not displayed to the calling party/meeting organizer. Moreover, the called party can choose to call back using the virtual meeting solution, also without direct knowledge of the other party's telephone number. Either party can deny further calls from the other should they decide not to follow-up with further communications. Thus, the parties can have several conversations before they provide personal information, such as their respective telephone numbers. Moreover, the parties can use video, share documents, use chat services, and share various types of information (e.g., links to possible options meeting places) through the use of the virtual meeting solution.

Particular implementations synchronize meetings information with a calendar-providing server application, such as using Internet Message Access Protocol (IMAP), Post Office Protocol (POP, POP3) or other protocols to access data stored on an email/calendar (e.g., Microsoft-Exchange) server. This can include downloading or uploading meeting schedules from the server.

Embodiments of the present disclosure relate to simultaneous meetings being implemented for a single attendee. The hosting meeting server recognizes that an attendee is listening to multiple meetings simultaneously and merges the audio into a single audio transmission. The attendee can dynamically mute or adjust the volume for one or more of the meetings thereby allowing for movement between the two meetings.

Consistent with another embodiment of the present disclosure, the virtual meeting solution provides meeting participants with the option to multicast the meeting to others. The multicast of the meeting can be implemented so as to originate from the server or from the meeting participant's remote device as selected by the user. Each user can control the specifics of what is multicast including the addition of content to the multicast stream, such as a personal commentary on the happenings of the meeting. Certain implementations provide a centralized location from which meeting participants can post their multicast stream information for others to view and select.

In some instances, the virtual meeting solution incorporates the ability to share images, audio and other data-types through the chat portion of the interface. As the chat interface allows for private messaging between less than all of the meeting participants, this functionality allows for meeting participants to share information without cluttering the main meeting content with information from various participants that may wish to share information with each other, but not with the entirety of participants in the meeting.

Other aspects of the present disclosure relate to subscribing to meeting groups. After such a subscription is implemented, the subscribers are thereafter automatically invited to meetings scheduled for the meeting group. In this manner, the meeting organizer does not need to invite, or otherwise keep track of, the list of participants for the meeting. Instead, meeting participants control whether or not they will be invited to a meeting. For various implementations, access to published meetings can be controlled/allowed as a function of whether or not a subscriber has paid for access to the meeting.

A relatively powerful application of such a participant-controlled subscription model relates to a meeting board for which potential participants can visit to identify and subscribe to meetings for which they are interested. In addition to subscribing to individual meetings, the participants can subscribe to meeting groups to thereafter be automatically invited to meetings falling into the particular groups. The meeting board can be accessed through a website. Meeting organizers can publish meetings and meeting groups for participants to review and subscribe. Meeting participants access the meeting board, search for desired content, and subscribe thereto. Meeting organizers can choose to have a notification of their published meetings sent to potential participants so that they are made aware of the meeting. The published meetings can each be given a distinct website address that can be provided as part of the invitation and can be used by the meeting organizer to direct participants to the proper published meeting.

A particular implementation of such a subscription-based model is particularly useful for teaching applications. Students can be subscribed to meeting groups according to classes for which they are registered. When a teacher or other meeting organizer schedules a meeting, they can designate the group for which the meeting is attended. Subscribers of the meeting are automatically invited to the meeting. This can also include automatically calling the meeting participants at the meeting time, sending an email of meeting details, adding the meeting to calendar programs, as well as other aspects discussed herein. To facilitate control of which participants are subscribed to which groups, a simple interface is provided for meeting groups to be generated, participant lists to be updated and for meeting organizers to have access rights to create meetings for the appropriate groups. This interface allows for uploading of data formatted such that it defines groups and associated participants.

Other implementations of a subscription-based model are particularly useful for public meetings, such as government meetings/hearings that are open to the public. The meeting can be opened (e.g., during a specified time period) to the participants to allow for feedback. This can be controlled by queuing remote-participants that request participation (e.g., participants that wish to ask questions or provide input). Each remote-participant can be given an opportunity to speak or otherwise provide input.

A specific implementation relates to integrating meeting functions with social websites. Social websites (e.g., Facebook or MySpace) often provide users with the opportunity to schedule events, to invite friends and/or to establish groups that others can join. Aspects of the present disclosure relate to integration of the virtual meeting solution with such social websites. In one implementation, an application can be integrated with the social website. The application can allow a participant to create an event within the social website parameters. When users are invited and/or join the event, the application automatically adds the users to the virtual meeting information. When the event time is reached, the virtual meeting can establish connections with the users by accessing the virtual meeting information and responding accordingly. In another implementation, users can join groups. When new events/meetings are created for the groups, the associated users can be automatically added to the events/meetings within the virtual meeting environment.

In a particular implementation of the present disclosure, security information is passed from the social website to the virtual meeting system to confirm the participants' identities. For instance, social websites often use username and password security features. The virtual meeting system can verify a user's identity upon receiving verification from the social websites. This can be particularly useful for reducing the number of times a participant must provide security information and for limiting electronic meetings to be generated nefariously (e.g., spamming meetings from unknown persons).

Embodiments of the present disclosure relate to feedback mechanisms for participants of a meeting. A particular, non-limiting example, involves a survey that is presented to meeting participants after the meeting is concluded. Participants provide responses to the survey and these results can then be provided to the meeting organizer. This is particularly useful for meetings in which the participants are unknown to the organizer, such as may be the case with the subscription-based implementations. The meeting organizer can configure and design the survey or select from default surveys provided as part of the virtual meeting solution.

Embodiments of the present disclosure relate to an application running on a computer, mobile phone or similar device that can be used to automatically launch a web-browser when receiving an incoming call from the virtual meeting solution. For instance, the application can detect certain information within the caller-id that identifies the incoming call as corresponding to a meeting. The application can then automatically launch the meeting application or launch in response to the acceptance of the call. In certain implementations, the caller-id can contain information useful for directing the web-browser to the appropriate meeting. For instance, the caller-id can contain a meeting identification number recognized by the meeting-hosting server as corresponding to the desired meeting. This can be supplemented or alternatively implemented using Short Messaging Service/Multimedia Messaging Service-(SMS/MMS) type messages to pass such data or automatically launch a meeting.

Turning now to the figures, FIG. 1 depicts a virtual meeting system diagram consistent with an embodiment of the present disclosure. Conference server 102 provides a web-accessible virtual meeting interface that can be accessed at remote participant locations 116, 118 over a wide area network (WAN) 106, such as the Internet. Conference server 102 provides audio, video, document sharing, desktop sharing and other aspects over WAN 106. Audio and other data can also be provided over standard telephone lines, such as a public switched telephone network (PSTN) 104. In a particular implementation, the web-accessible interface is implemented such that it can run natively within standard web-browsers. In particular, no installed application or plug-in is required other than the web-browser application itself. Specific implementations provide such functionality through a Flash-based web-site application hosted by the conference server 102.

The conference server 102 can be implemented using one or more computer processors executing stored program instructions. The various functions can be distributed or shared between multiple computers or implemented using a single computer depending upon the constraints of the system. Thus, the conference server 102 could reside in several locations simultaneously by, for instance, sharing functions between different physical computers.

Remote participant locations 116, 118 include one or more devices (e.g., 112, 120 and 124) for accessing meeting data from conference server 102. Although meeting participants can attend the meeting through audio-only connections (e.g., over the phone or using a computer with VoIP capabilities), the examples depicted in FIG. 1 include at least one computer 112, 124 with an associated web browser 114, 122. This implementation provides participants full access to a suite of meeting capabilities and options while running natively within a web browser. Running natively within a web browser can be particularly useful for participants that are traveling. Often such traveling participants access the meeting application using computers that are provided by others, e.g., public computers available in hotels or computers at a customer location. Such computers need not have a software application or plug-ins installed to provide access to the virtual meeting solution. This native aspect can also be particularly useful for participants that do not have installation rights to a particular computer, such as is sometimes the case for security and other reasons.

Within the web-browser application, connections can be established to transfer a variety of meeting information. For instance, audio (e.g., VoIP) connections can be established should the computer have speakers and/or a microphone; video connections can be established should the computer have display and/or a camera; data connections can be established to share documents, chat functions and other data. The virtual meeting solution can use a variety of different protocols to establish such connections. In various implementations, Session Initiation Protocol (SIP) is used to setup and tear down connections for streaming audio or video. The streaming data can be transmitted within the RTP, RTSP, RTMP (Real-Time Messaging protocol) and RTMPT (RTMP through HTTP Tunneling) protocols. A particular implementation attempts to use one of RTP, RTSP or RTMP and, if unsuccessful due to a firewall, network address translation (NAT) or otherwise, uses RTMPT to establish an HTTP tunnel. This preference for a non-tunneling protocol can be useful as the use of HTTP tunneling can introduce additional delay.

In certain implementations, the audio content can be communicated using various telephonic devices including, but not limited to, landline telephones, cellular telephones and VoIP telephones. The virtual meeting solution provides options for participations to call into the meeting or to have the virtual meeting solution actively call-out to the participants. For instance, a meeting organizer can select one or more potential participants and instruct the conference server 102 to call the participants. The conference server 102 attempts to contact the participants by using an associated telephone number (or IP address). Participants that respond are provided with audio content from the meeting. If desired, a brief introduction can be presented along with options for the user to accept or decline entrance into the meeting. In connect with the call, the potential participants can also be sent meeting connection information (e.g., in the form of a website Uniform Resource Locator (URL)) for accessing other aspects of the meeting, such as shared documents, video and chat functionality. This meeting connection information can be sent using, as non-limiting examples, email, SMS or MMS.

Figure 2:
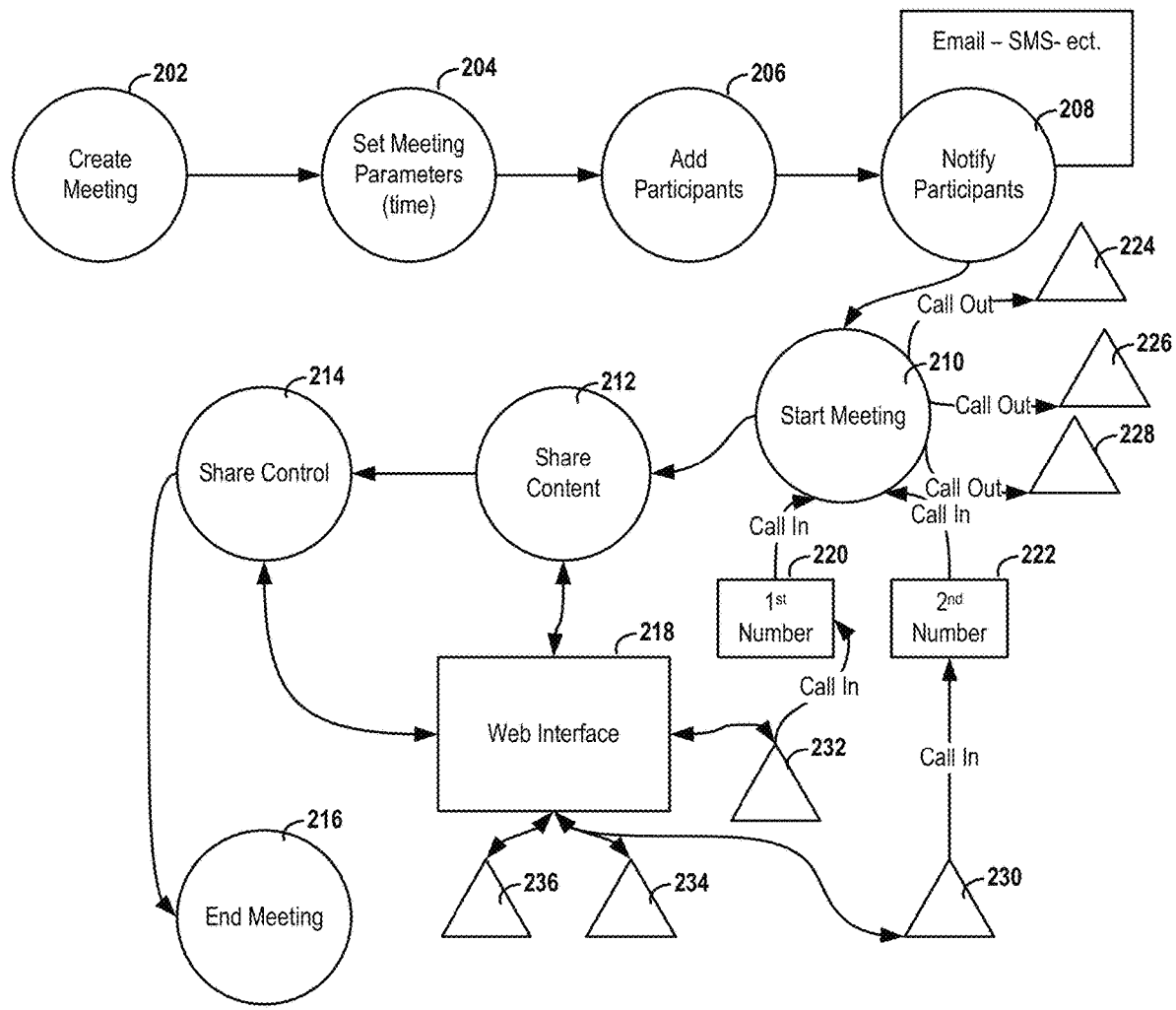
FIG. 2 depicts a flow diagram for establishing and conducting a meeting, consistent with aspects of the present disclosure.

FIG. 2 depicts a flow diagram for establishing and conducting a meeting, consistent with aspects of the present disclosure. The meeting organizer creates meeting 202. This can be implemented through an interface that is implemented native to a web-browser. The meeting organizer sets the meeting parameters 204, which can include the time, length, meeting description, as well as other factors. Participants are added to the meeting 206. In a first implementation, the meeting organizer selects and adds participants to the meeting. These participants can be selected from an existing contact list, newly created contacts or specified in some other manner, such as by email address or telephone number. In another implementation, the participants can add themselves to the meeting. For instance, a meeting organizer may post details about the meeting on a meeting board that lists meetings. Participants that are interested in the meeting can then subscribe to the meeting.

Meeting participants can be notified of the meeting details 208. The notification can be implemented using, for instance, email, SMS, MMS, a calendar invite and/or a voice mail message. When the meeting start time arrives and/or the meeting organizer indicates that the meeting should start 210, participants 224, 226, 228, 230, 232 are connected to one another using the virtual meeting solution. The participants can join the meeting by actively calling in to a telephone number (or IP address for VoIP connections) 220, 222 or can be called by the virtual meeting solution. The ability to have multiple telephone contact numbers can be particularly useful for meetings in which participant are located in geographically disperse areas including different calling areas and/or countries. For instance, call in numbers can be provided that are local to the participants, such that long distance or international call charges can be avoided/lessened for the participants.

The virtual meeting solution also provides the ability to share 212 a variety of content in addition to audio. In a particular implementation, the sharing is implemented using a web interface 218 that runs native to a web browser application. The shared content can include, among other things, video content, chat sessions, images, documents, shared view of desktop, shared view of individual windows and/or shared view of portions of a desktop. Other aspects relate to the ability to provide shared control 214 over meeting functions and/or remote control of a participant's computer. For instance, one or more participants can be given the authority to perform functions such as inviting or removing participants, sharing content and audio speaking rights. Moreover, a participant can give control over their computer to a remote participant. This can be useful for allowing remote configuration, editing and display of content such as might be provided by a spreadsheet application.

The meeting completes 216 and terminates the connections between participants. Meeting completion can be indicated by the meeting organizer, by all participants leaving the meeting or after a prescribed time has been reached.

Figure 3:
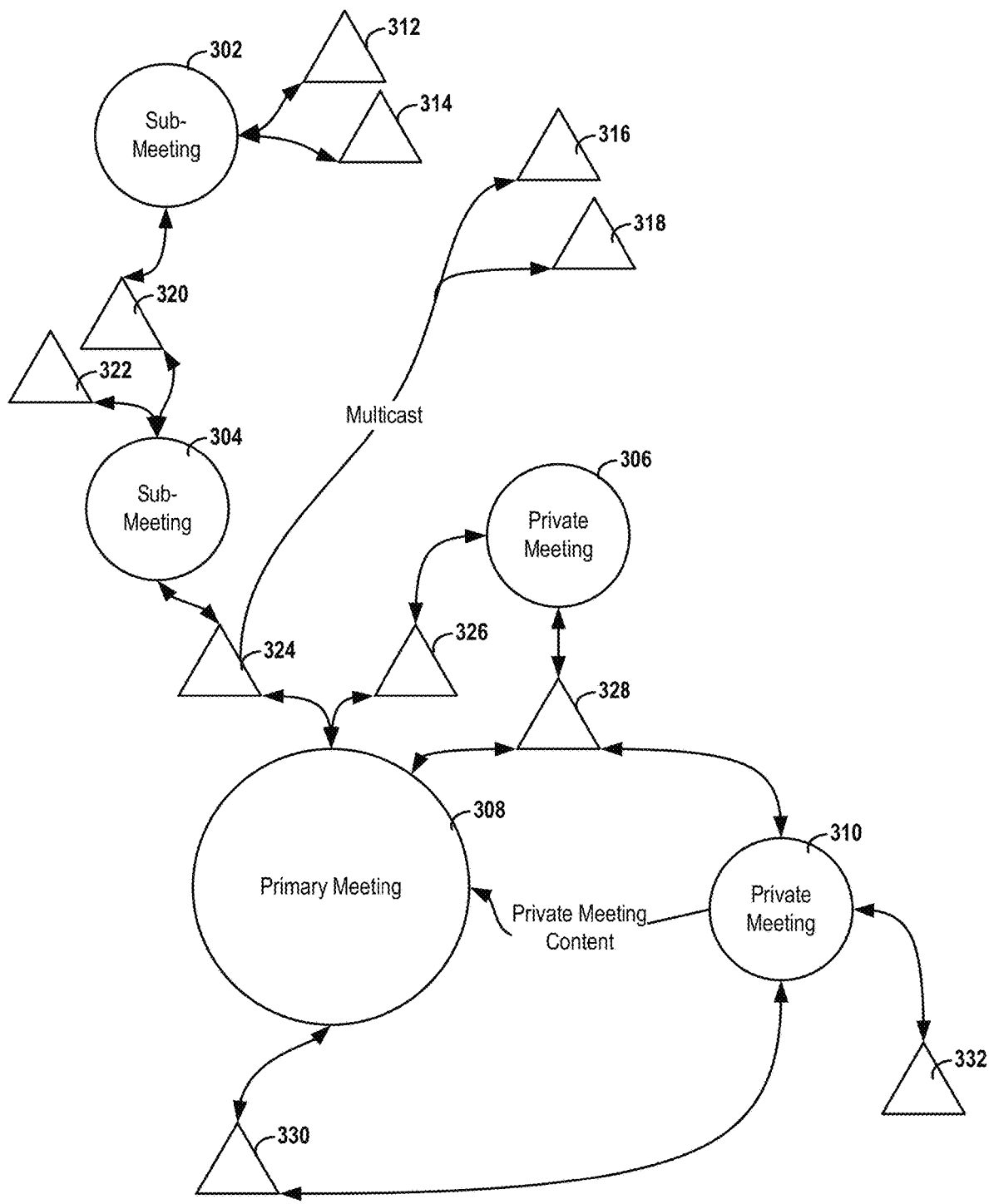
FIG. 3 depicts a data flow diagram for virtual meeting hosting implementations involving multiple meetings, consistent with embodiments of the present disclosure.

FIG. 3 depicts a data flow diagram for virtual meeting hosting implementations involving multiple meetings, consistent with embodiments of the present disclosure. Aspects of the virtual meeting solution take advantage of the ease with which meetings can be created and with which the meetings can be controlled. This can be particularly useful for organically generated meetings that are not necessarily planned ahead of time. Moreover, aspects are particularly useful for implementing multiple simultaneous meetings, which can be structured according to a hierarchical meeting structure.

In one implementation a primary meeting 308 can be started with meeting participants 324, 326, 328, 330. This meeting can provide some or all of the various features of the present disclosure. Moreover, meeting participants may wish to establish meetings 306, 310 that include a subset of all the meeting participants of the primary meeting 308, or even additional meeting participants 332 not otherwise part of the primary meeting. These meetings are labeled as private meetings because they do not necessarily include each participant of the primary meeting. Moreover, the meeting organizer may have no knowledge of the private meeting. The participants have the freedom to establish the private meetings and, within the private meetings, to share information.

For instance, a primary meeting may be a relatively open/public meeting having many participants. In such an instance restrictions on sharing of content may be placed on many of the participants (e.g., input from too many participants could create a confusing and uncontrollable environment). These participants may still wish to share information between one another while attending the primary meeting. The virtual meeting solution provides the participants with the ability to establish a private meeting 306, 310 while still being part of the primary meeting 308. The private meeting could provide the participants with the ability to share information and to discuss topics being presented in the primary meeting 308.

Another meeting type is referred to as a sub-meeting 302, 304. The sub-meeting is conceptually different from a private meeting in that it is visible as a meeting from participants of the primary meeting and that the control/setup and other aspects stem from the primary meeting. The participants 312, 314, 320, 322 of sub-meetings can each be common to the primary meeting 308 or one or more can be new in the sense that they are not part of the primary meeting. As an example, a primary meeting may be established for addressing a relatively broad subject. The participants of the primary meeting agree that the subject matter is best addressed once solutions/answers are found for several different sub-issues. Sub-meetings can then be formed to work on the identified issues and after the sub-meetings convene the primary meeting can resume going forward with the findings of the sub-meetings. The virtual meeting application is also flexible enough to allow for sub-groups to form additional sub-groups therefrom. The primary meeting provides an interface that lists the various sub-meetings and allows a meeting organizer or other participants to select which, if any, sub-meetings they wish to join. In this manner, sub-meeting progress can be monitored and findings of sub-groups can be shared by having participants move from between sub-meetings. Content (e.g., documents, chat transcripts and other work product) from the sub-meetings can be shared with the primary meeting participants. This allows for seamless transitioning between sub-meetings and the primary meetings.

An example implementation for the primary/sub-meeting hierarchical structure is a teaching session. The primary meeting can be led by a main speaker/teacher. At times during the meeting groups of students can be split into various sub-meetings to work on a problem associated with the primary meeting/lecture. The sub-meetings could be led by teaching assistants or by the students themselves. The main speaker/teacher can easily move between sub-meetings to check on the status and to assist as needed. Moreover, students can return to the primary meeting to ask questions of the main speaker/teacher.

Other aspects of the present disclosure relate to the option for a participant 324 to multicast the meeting to multicast subscribers 316, 318. The content of the primary meeting 308, a private meeting 306, 310 or a sub-meeting can be sent within the multicast stream. The multicast stream can be sourced from the participant's computer or from a conference server.

The virtual meeting solution also allows a meeting organizer to disable the sharing capabilities for meeting participants. This can include limitations on forming private or sub-meetings.

FIGS. 4-12 depict screen shots of various aspects of the virtual meeting that can be provided to participants. Although not necessarily limited to such an implementation, these aspects can be provided from a web-driven application that runs natively within a web-browser.

Figure 4:
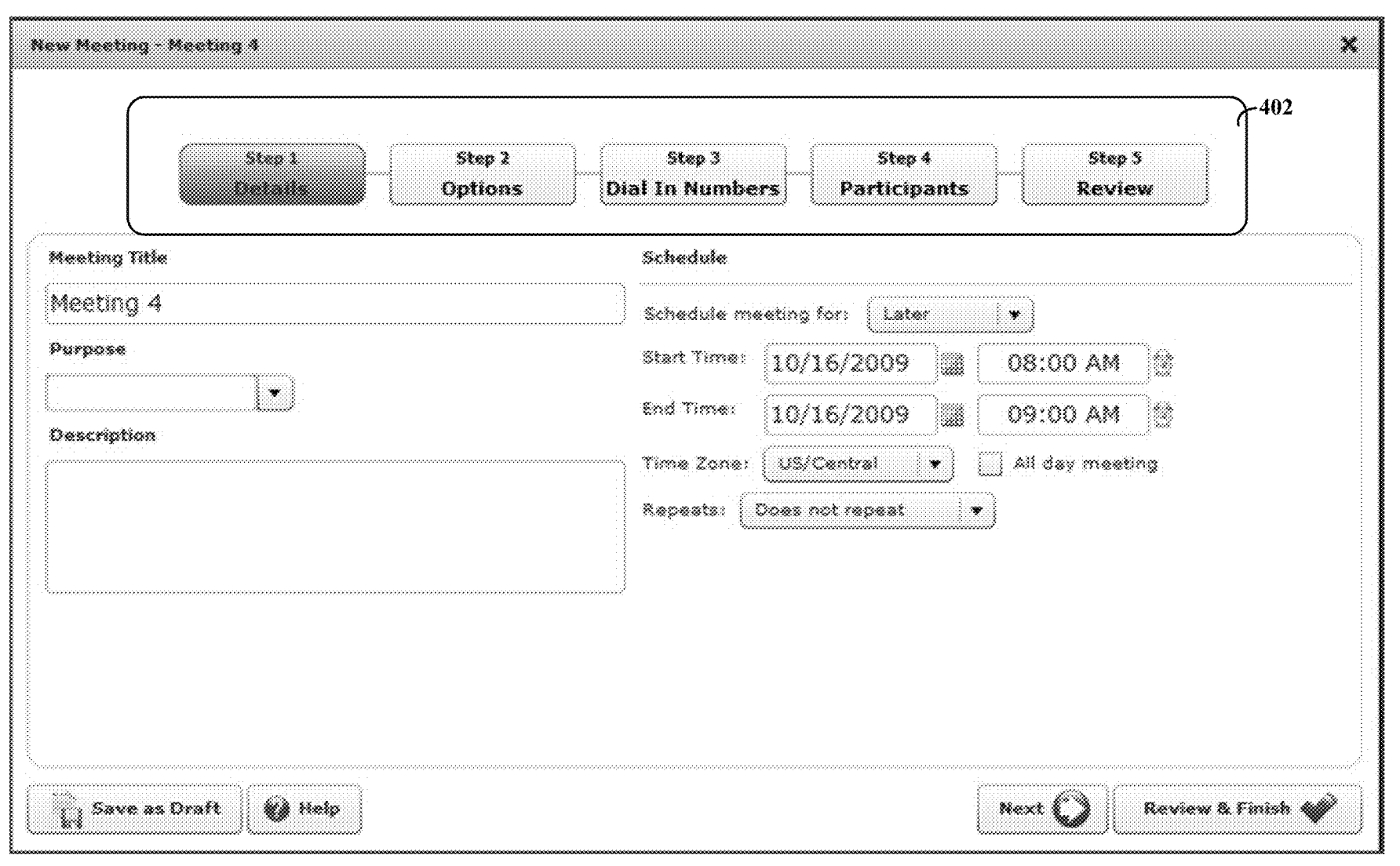

FIG. 4 depicts a user interface related to selection of meeting details, consistent with an embodiment of the present disclosure. In one embodiment, a meeting setup contains five steps 402: providing details, setting of options, selection of dial in numbers, adding of participants and review of the meeting details. The options presented as part of the first step include, for instance, meeting title, meeting purpose, meeting description, meeting time/date, meeting time zone and whether the meeting repeats (e.g., daily, weekly or monthly). At any point in the process of setting up a new meeting, the meeting can be saved as a draft. At a later time, the saved draft can be recovered and the remaining setup steps can be implemented.

Figure 5:
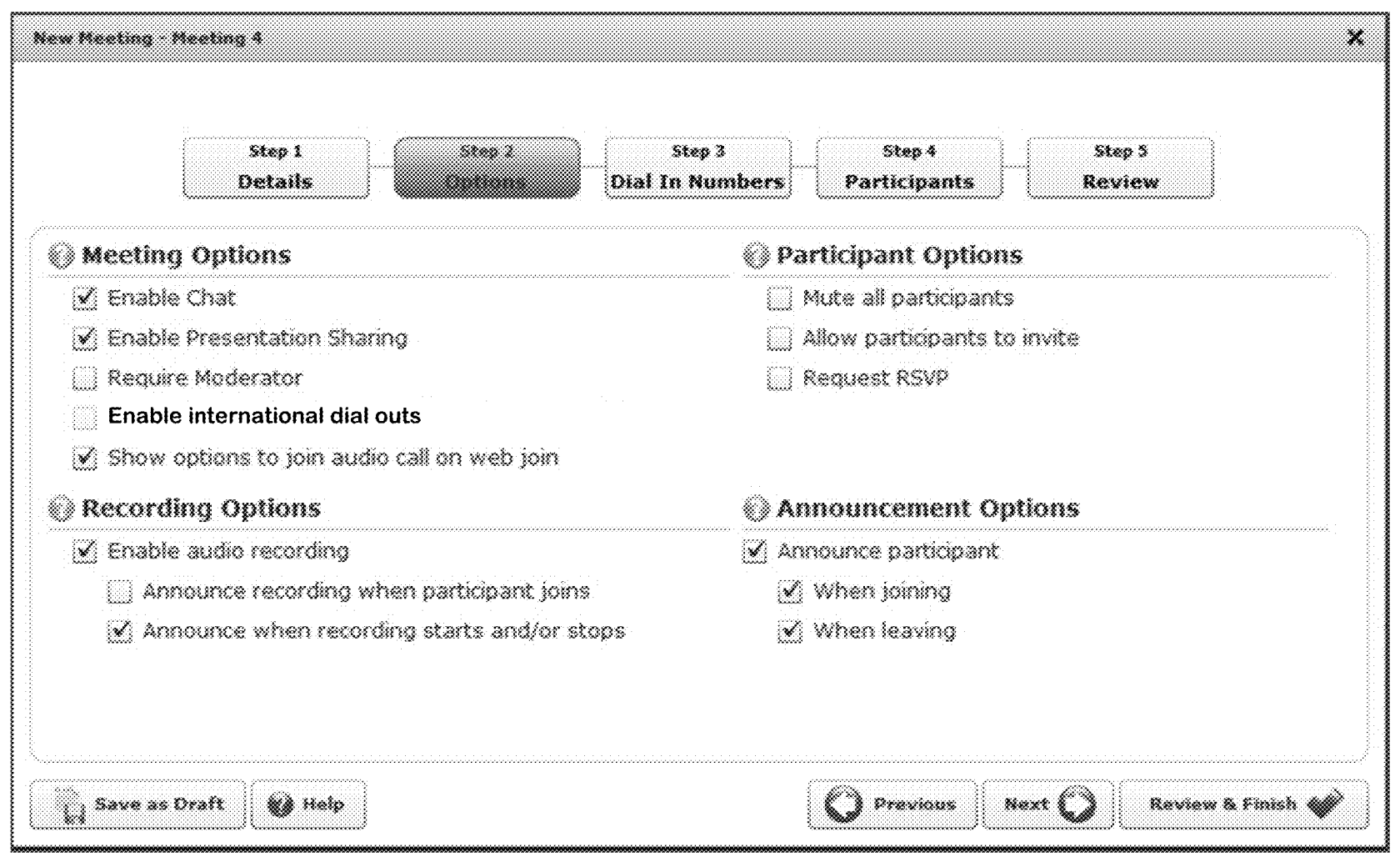

FIG. 5 depicts a user interface that relates to setting of meeting options, consistent with an embodiment of the present disclosure. The meeting options, as depicted in FIG. 5, include a few possibilities for meeting options. These options include enabling of chat functions and presentation sharing. Other options relate to whether moderator presence is required for the meeting, whether international dial outs are allowed (as toll charges might be assessed) and whether audio options for joining are provided to participants that connect using a web-interface. Options are also provided for recording of the meeting content including whether or not it is allowed, whether the recording is announced when a participant joins and whether or not an announcement is played when recording starts or stops. Participant-specific options include muting of all participants, allowing participants to invite others and whether participants are requested to RSVP to a meeting invite. Announcement options include whether or not it should be announced when participants join or leave a meeting. These options represent some of the possible options that can be presented and are not limited to the variety of options that can be provided to a meeting organizer.

FIG. 6 depicts a user interface that relates to selection of dial in meeting number(s), consistent with an embodiment of the present disclosure. The options depicted in FIG. 6 shows two dial in numbers as options for selection. The suggested numbers can be presented based upon default settings of the meeting organizer, meeting organizer location, cost or other factors. If desired, additional numbers can be added from the available numbers.

In another embodiment, the dial in numbers can be presented after participants have been added. The virtual meeting solution can then automatically suggest dial in numbers based upon the locations of the participants.

Figure 7:
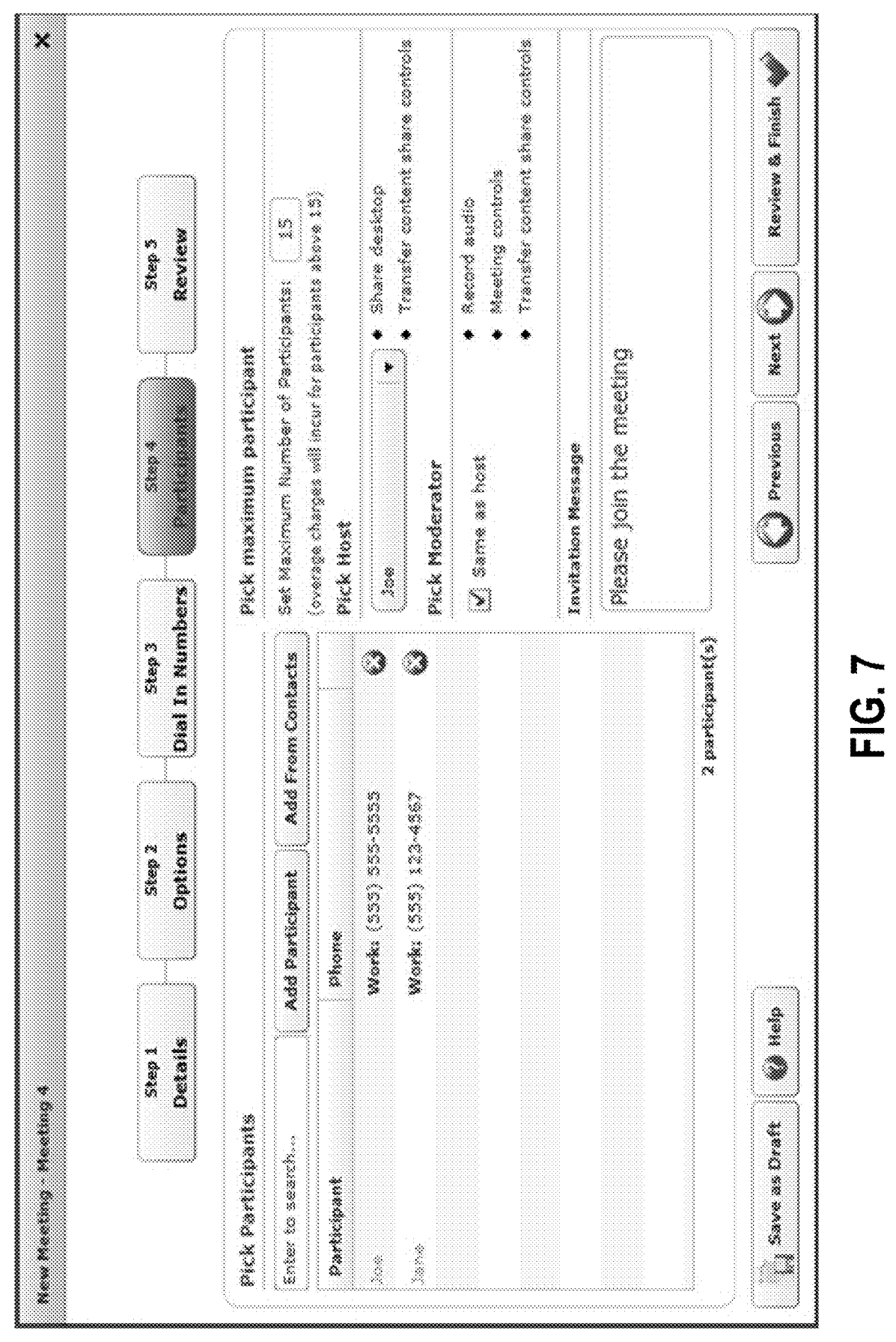

FIG. 7 depicts a user interface that provides for the addition of participants and the selection of a host and a moderator, consistent with an embodiment of the present disclosure. Step four allows the meeting organizer to add participants to the meeting. The participants can be manually entered, including adding such information as name, telephone number, email address and the like. Alternatively, participants can be added from a contact list. This contact list can be directly populated by the meeting organizer and by saving past manually entered participants to the contact list. The contact list can also be imported from existing programs, such as email contact lists. In a particular implementation, the contact list can be maintained by accessing an email server running an application, such as a Microsoft exchange server.

In addition to adding the participants, the host and moderator can be selected. In the configuration shown, the host is given permission to share the desktop and to control which other participants can share desktop or other information. The moderator is given control over recording functions, content sharing rights, and other meeting controls (e.g., adding, removing, or muting participants). An invitation message can also be provided to explain the details of the meeting to the invited participants.

The review process (not shown) shows the details of the information entered in steps 1-4 and provides the meeting organizer with the opportunity to confirm that the meeting is correctly configured.

Figure 8:
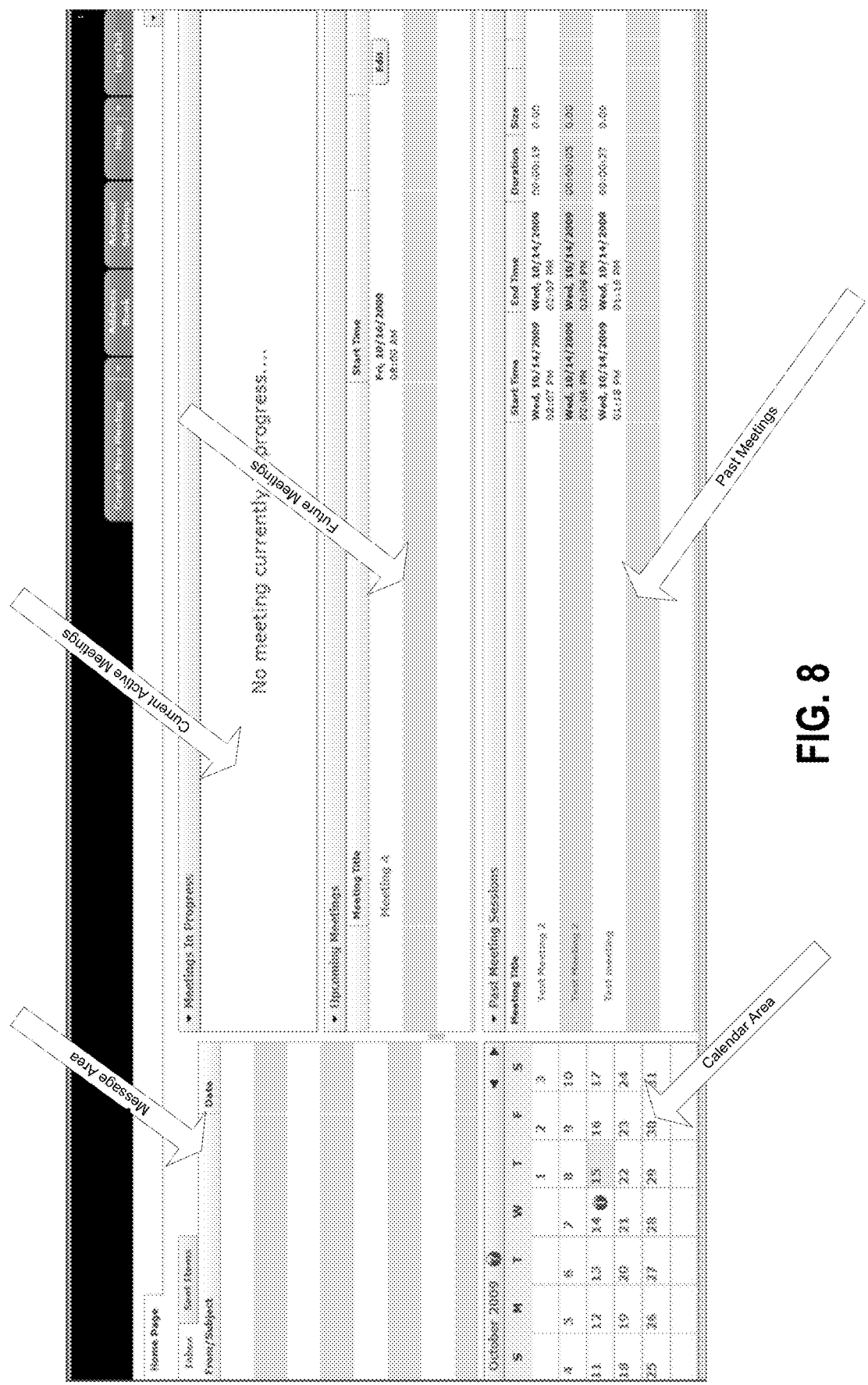
FIG. 8 depicts a user interface for managing, viewing and configuring meetings, consistent with an embodiment of the present disclosure.

FIG. 8 depicts a user interface for managing, viewing and configuring meetings, consistent with an embodiment of the present disclosure. The interface includes a past meeting section that shows meetings that have already occurred and concluded. In this section it is possible to select a meeting and to retrieve information about the meeting. It is also possible to copy meeting information from a previous meeting and thereby create a new meeting starting from the same meeting settings. Also displayed and accessible in a similar manner are current meetings and future meetings.

A calendar area shows scheduled meetings, whether in the past, the future or the present. The calendar can also show events other than virtual meetings. These events can be added manually or imported/synchronized with an external calendaring program, such as a Microsoft exchange server. A message area can also be provided. Messages can include meeting invitations or communications between users of the virtual meeting solution.

Figure 9:
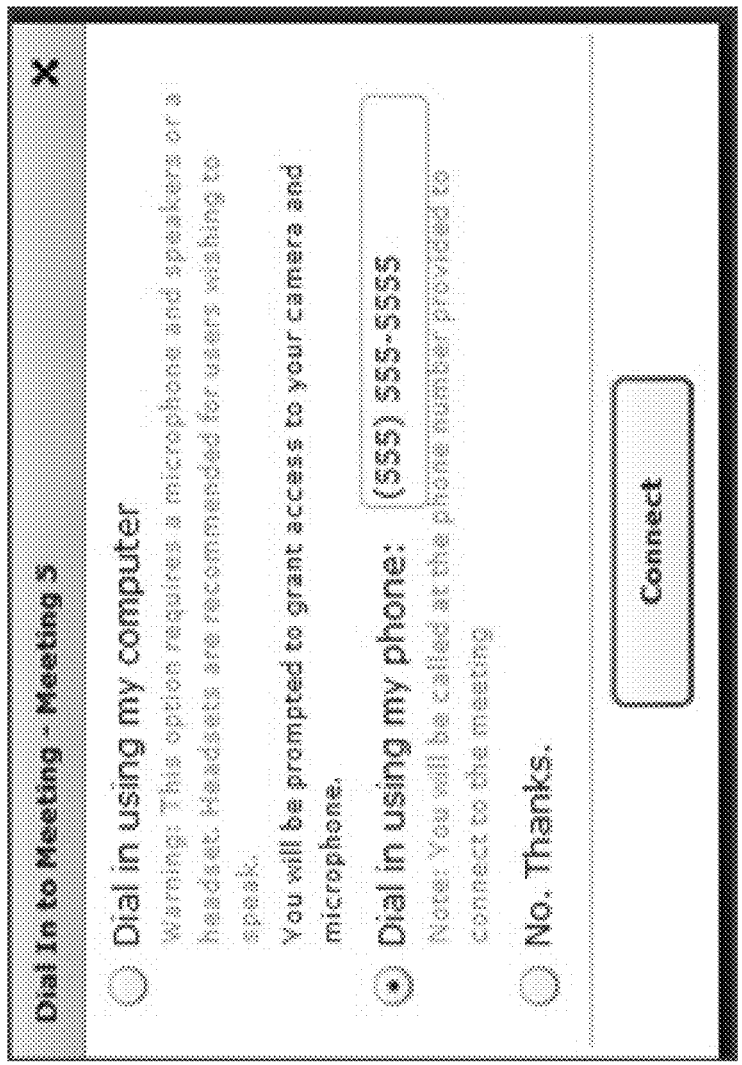
FIG. 9 depicts options for connecting to audio portions of a meeting, consistent with an embodiment of the present disclosure.

FIG. 9 depicts options for connecting to audio portions of a meeting, consistent with an embodiment of the present disclosure. The non-limiting implementation depicted in FIG. 9 provides a participant with options when joining a meeting. For instance, a participant can choose to connect through VoIP using the same computer as the web-browser used to join the meeting or to have the meeting call the participant's telephone number. A third option is to not connect through either of these options. A participant might choose this third option if they were calling into the meeting, if audio was not desired, or if several people were sharing a speaker phone, but had individual computers.

Figure 10:
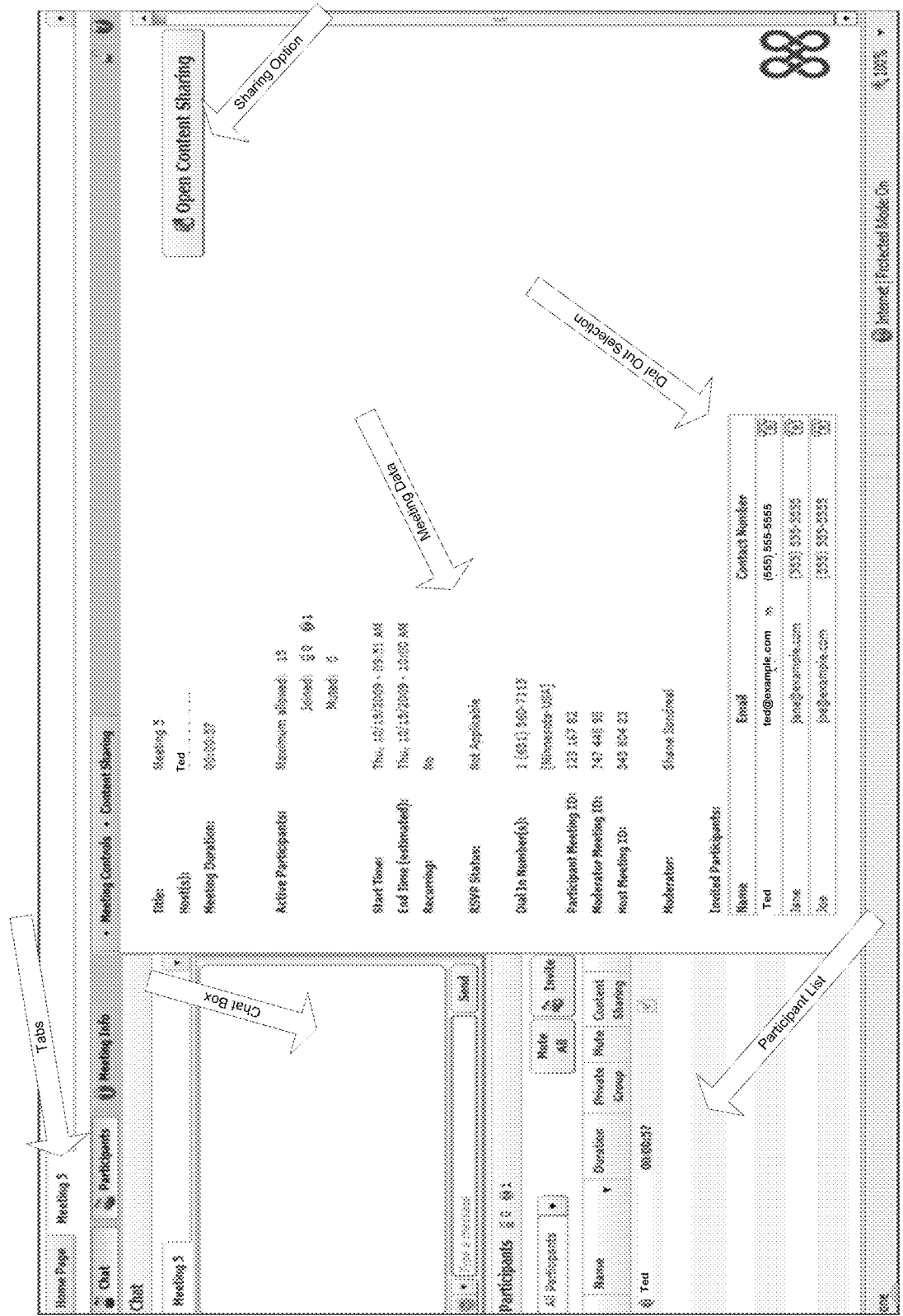
FIG. 10 depicts an interface for an active meeting, consistent with an embodiment of the present disclosure.

FIG. 10 depicts an interface for an active meeting, consistent with an embodiment of the present disclosure. At the top of the page are tabs that represent different interface screens, such as a home page (e.g., FIG. 8) and one or more active meetings. FIG. 10 depicts one such tab for an active meeting. A chat box area allows users to share text communications in real time. Also shown is a participant list that shows which participants are currently in the meeting. In this instance, only one participant is currently in the meeting. A dial out selection option can be used to request that one or more participants be called so that they can join the meeting. This can be implemented by a simple click of the telephone icon. The corresponding participant telephone number is then called. If desired, each participant can have multiple telephone numbers, which can be selected based upon a user profile and/or sequentially called in the case that the participant is not able to be reached.

General meeting details are provided for viewing along with a content sharing option. If a meeting host is sharing content, the content will appear in the tab for viewing by all participants. A host can begin sharing by clicking on the content sharing options.

Figure 11:
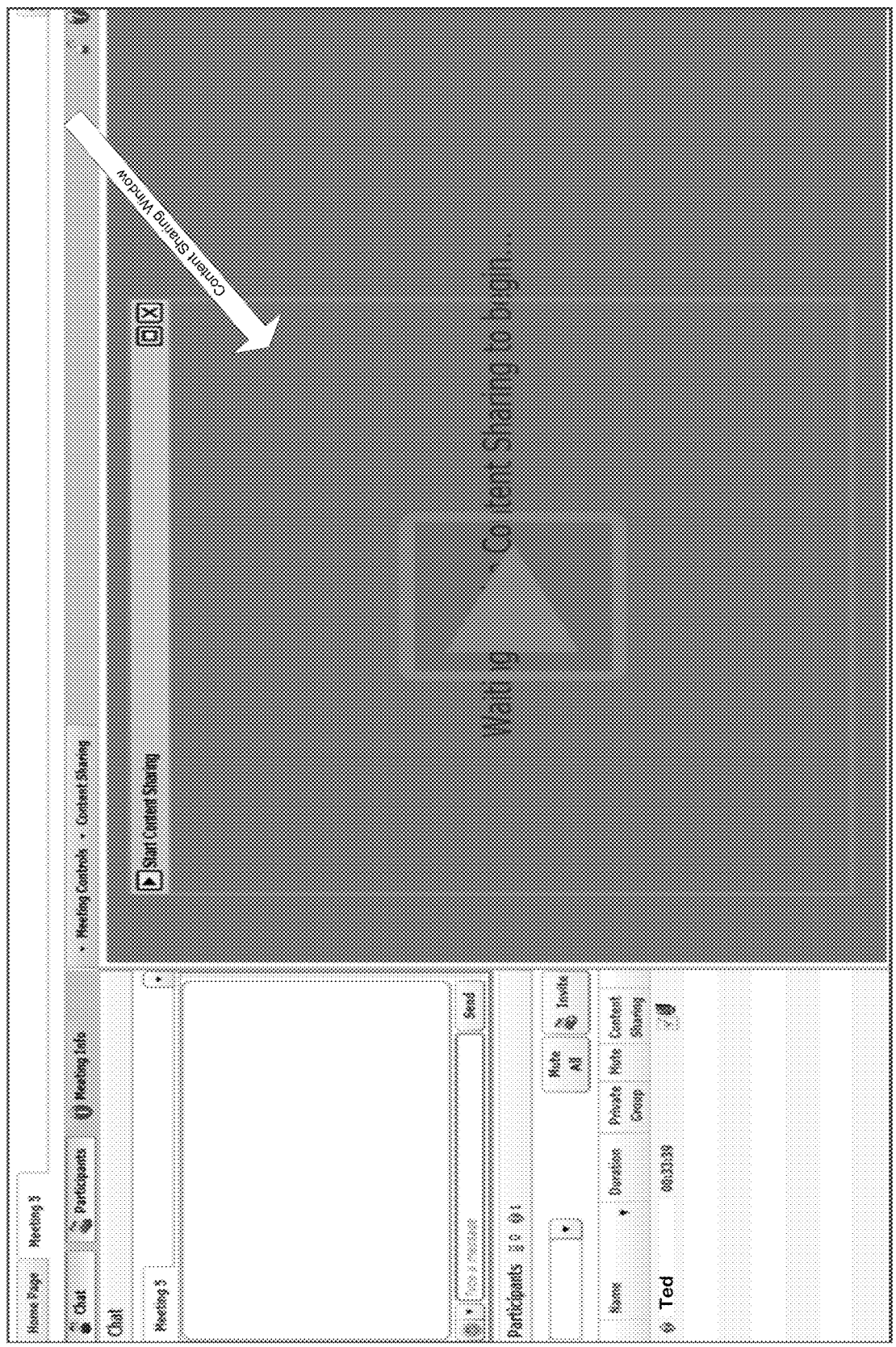
FIG. 11 depicts an interface that is provided to allow for content sharing, consistent with an embodiment of the present disclosure.

FIG. 11 depicts an interface that is provided to allow for content sharing, consistent with an embodiment of the present disclosure. When a participant that has sharing rights selects the content sharing option, they can be presented with several sharing options. For instance, they can share their entire desktop, share a specified tab/application or share content within a configurable/floating content sharing box. FIG. 11 shows a content sharing box. This box can be moved and sized as desired. When a content share presses the play option, whatever is within the box is shared with the meeting participants.

Figure 12:
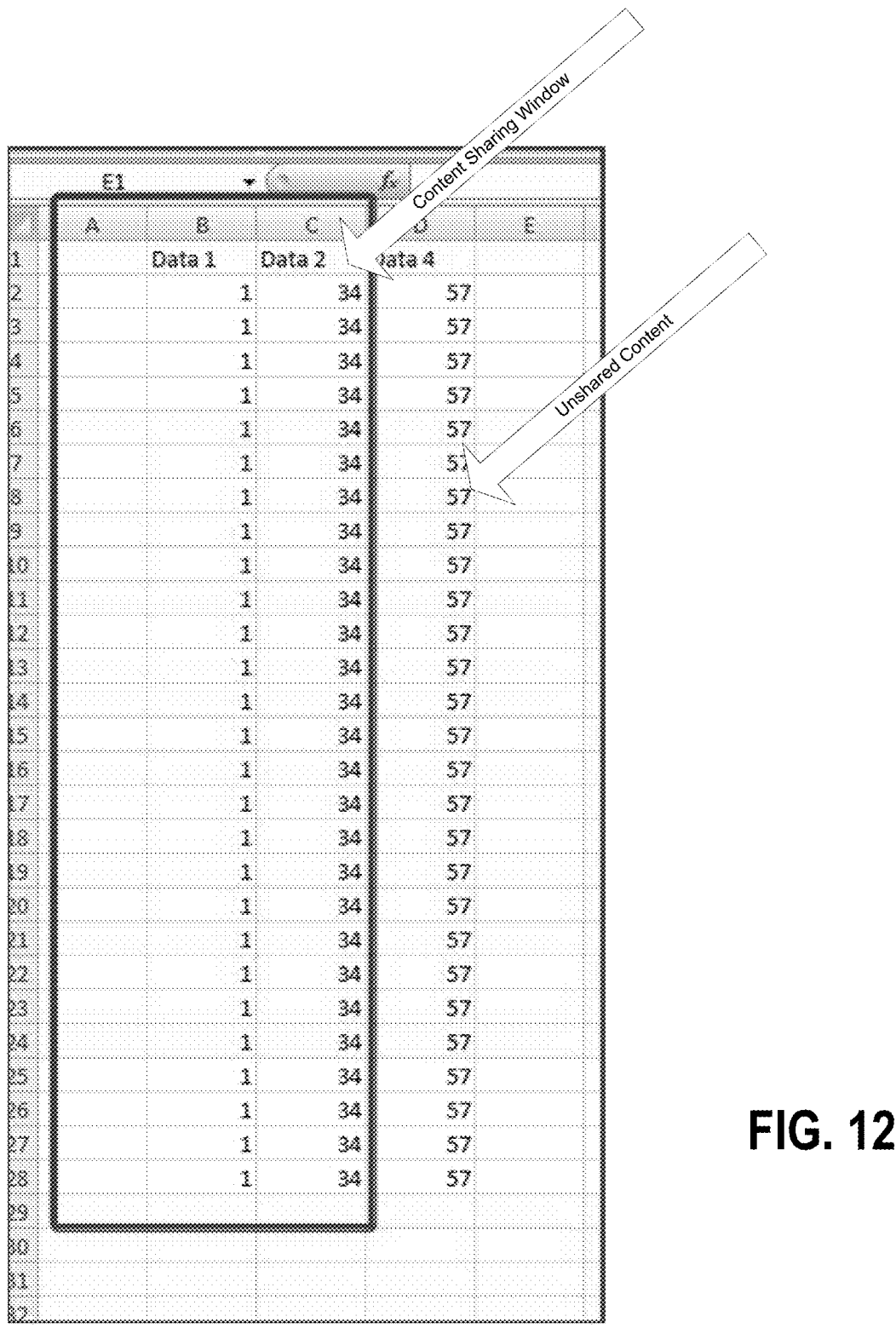
FIG. 12 shows an example use of the content sharing box, consistent with an embodiment of the present disclosure.

FIG. 12 shows an example use of the content sharing box, consistent with an embodiment of the present disclosure. The content sharing window allows for certain parts of a document/window to be shared without the rest being visible to the participants. Thus as shown, columns A, B and C and rows 1-29 would be shared, while data in other areas would not. This flexibility allows for simple control over what is shared to the participants. For instance, the sharing participant can see the entire document, but only share certain aspects. This can be particularly useful if the document contains confidential information or simply to draw the attention of the participants to only the shared area.

As discussed herein, it is also possible to share an entire window/application. The sharing participant selects a window from a list of currently available windows. The virtual meeting solution then shares all viewable content of the selected window. In a particular embodiment, the adjustable content sharing window can be used in tandem with such window sharing. The sharing participant again chooses to share a particular window, but also uses an adjustable window to limit what is shared within the window. In this manner, there is a tiered sharing control that limits sharing first to the selected window and then further limited to selected portions therein. This can be particularly useful as a sharing participant may otherwise inadvertently switch windows in a manner that changes what is shared using the adjustable content sharing window.

Consistent with a particular embodiment of the present disclosure, whiteboard-type functionality is provided to allow users to interactively share content. This whiteboard feature allows users to dynamically draw, highlight, underline or otherwise provide input regarding shared content. For instance, using the whiteboard feature, the participants can highlight certain portions of presentations with free-hand writing. The participants can control the size color and sensitivity of the highlighting tool. Whiteboard privileges can be easily and quickly passed between participants. This can be very useful in an online tutoring/classroom kind of environments. For instance, student participants can be given virtual opportunities to write on the whiteboard, e.g., to point out aspects that are unclear to them, to explain their understanding of shared content or as part of a presentation for the other students.

Figure 13:
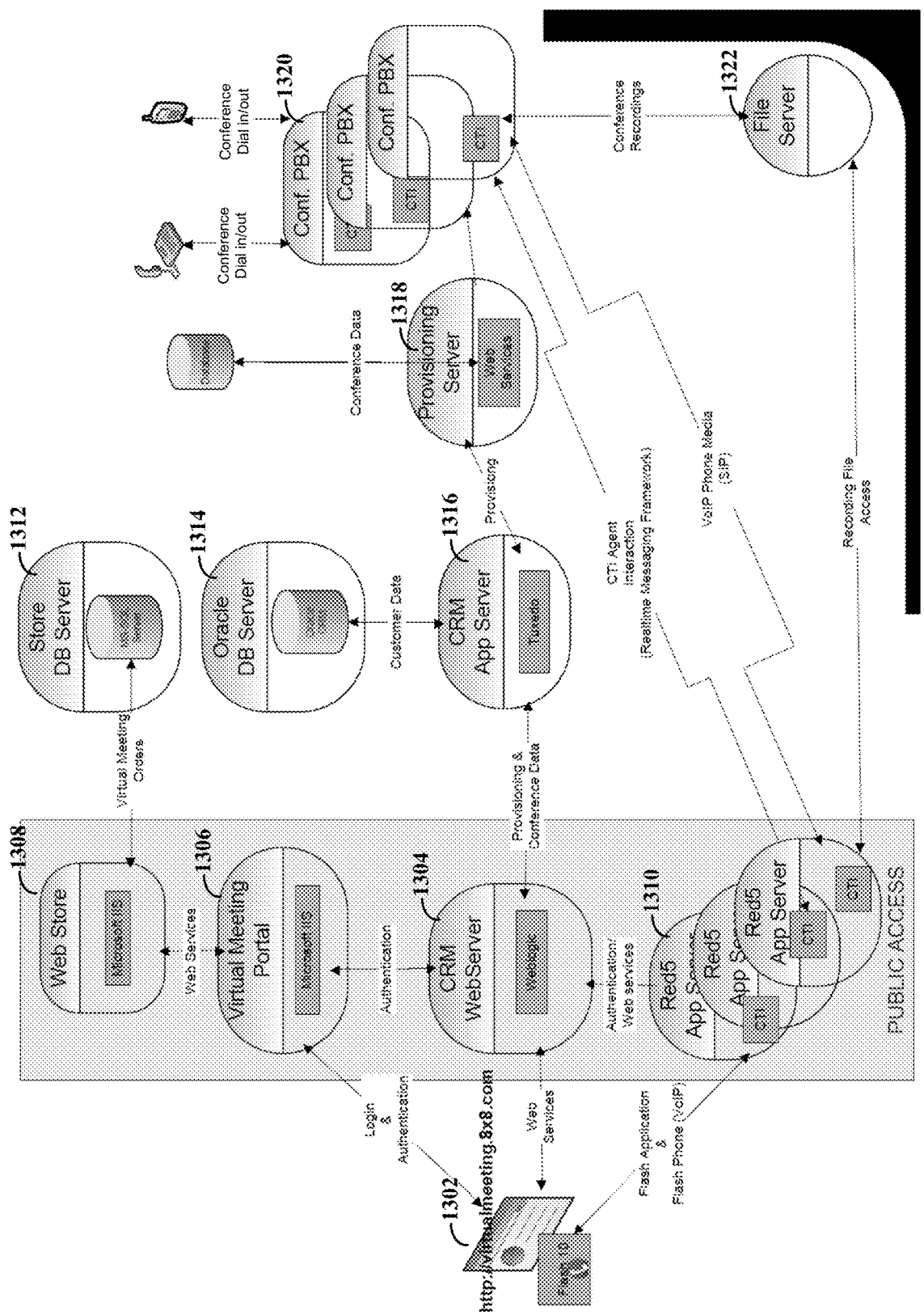
FIG. 13 shows an example of a virtual meeting architecture, consistent with an embodiment of the present disclosure.

FIG. 13 shows an example of a virtual meeting architecture, consistent with an embodiment of the present disclosure. Participants are allowed to access the virtual meeting solution through a web-interface 1302. Participants are identified and authenticated using a server 1306 (e.g., virtual meeting portal). The authentication can be implemented, for example, using an authentication server 1308, which can be implemented using Microsoft Internet Information Services (IIS). A server 1304 (e.g., a Customer Relationship Management (CRM) server), controls and tracks participant data including, for instance, accounts data (e.g., contact information, relationship history and revenue), customer service information, such as customer queries and complaints, activities for managing individual and group calendars and e-mail, and reports from customer data. In a particular implementation, the server 1304 is implemented using Oracle WebLogic software.

As discussed herein, various aspects of the virtual meeting solution can be provided to the participants natively to a web browser using Flash-based applications (e.g., Flash 10). These aspects can include VoIP functions and other data communications. In one instance, the Flash-based applications are provided by one or more Flash servers 1310 (e.g., Red5 open source servers).

A database server 1312 stores participant information, such as orders and licensing status for various virtual meeting features. In a particular implementation, database-server 1312 is implemented using an MS-SQL database. A CRM application server 1316 handles provisioning and conference data between multiple servers. Server 1316 accesses customer data stored in a database server 1314. The server 1316 can be implemented using various middleware, for example, Oracle Tuxedo software.

Provisioning server 1318 interacts with conference PBX server(s) 1320 to implement realtime data connections between participants. The PBX server(s) 1320 provide computer-telephone integration (CTI) functions. These functions, described in more detail herein, can include realtime messaging and/or VoIP connections between computers, telephones, cellular phones and other communication devices. A file server 1322 can be optionally implemented to provide meeting data recording, which can be accessed at a later date by participants.

The specific software packages and arrangement of servers discussed and depicted in connection with FIG. 13 provide a framework from which variations can be made. Thus, these aspects are not necessarily limiting. For instance, server and database components can be implemented as multiple computers, processors and memory devices operating in combination.

Aspects of the present invention are implemented using a variety of processing circuits, logic, communications arrangements and combinations thereof. Particular implementations use one or more specially configured computer processors that execute instructions to perform one or more of the aspects discussed herein. Various portions can be implemented using discrete or combinatorial logic, analog circuitry and using various forms of tangible storage mediums.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with a variety of technologies such as those involving home computers, servers, laptops, cellular phones, personal digital assistants, iPhones®, Blackberries® and the like. The invention may also be implemented using a variety of approaches such as those involving coordinated communications for public access. Such modifications and changes do not depart from the true spirit and scope of the present invention, including that set forth in the following claims.

What is claimed is:

1. A server-implemented method comprising:
presenting, via a server including at least one computer processor and communication circuitry, a meeting board that specifies a plurality of meeting groups and that is accessible to remote users; and in response to the server receiving selection of a particular meeting group by at least one of the remote users:

adjusting a list of the particular meeting group according to the selection, based on the at least one of the remote users, identifying a meeting scheduled for the particular meeting group using meeting schedule data of the particular meeting group, and in response:

identifying a set of the remote users that are subscribed to the particular meeting group indicated by the list, establishing data-communications connections for the set of the remote users subscribed to the particular meeting group by initiating an internet protocol connection, using the server and over the Internet, with at least one of the remote users subscribed to the particular meeting group, and merging the established data-communications connections for the set of the remote users for the meeting.

2. The method of claim 1, further including providing feedback regarding use of the meeting board to the server, from a set of the remote users.

3. The method of claim 1, wherein the meeting board provides details to the remote users of a virtual meeting scheduled via the meeting board, wherein the virtual meeting is conducted using the server and over the Internet.

4. The method of claim 1, wherein the meeting board provides to the remote users, via the server and over the Internet, information concerning meetings and meeting groups for participants to review.

5. The method of claim 1, further including using the server to establish a sub-meeting of the meeting with a subset of the remote users during the meeting.

6. The method of claim 5, wherein the sub-meeting is visible as another meeting to the remaining set of remote users during the meeting.

7. The method of claim 1, further including establishing, using the server, a private meeting with at least a subset of the remote users during the meeting, wherein the private meeting is not visible as another meeting to the remaining set of remote users during the meeting.

8. The method of claim 1, wherein the server provides a user interface for uploading data formatted to define meeting groups and associated participants.

9. The method of claim 1, wherein each of the set of remote users is subscribed to a particular meeting, and the server opens the meeting to the set of remote users subscribed to the particular meeting group to allow for feedback.

10. The method of claim 1, wherein each of the set of remote users is subscribed to a particular meeting, and the server opens the meeting by queuing the set of remote users subscribed to the particular meeting and recording input from at least one of the set of remote users.

11. A server-based meeting system comprising:

a server, including at least one computer processor and communication circuitry, to present a meeting board that specifies a plurality of meeting groups and that is accessible to remote users; and wherein the server, in response to the server receiving selection of a particular meeting group by at least one of the remote users, is to:

adjust a list of the particular meeting group according to the selection, based on the at least one of the remote users, identify a meeting scheduled for the particular meeting group using meeting schedule data of the particular meeting group, and in response:

identify a set of the remote users that are subscribed to the particular meeting group indicated by the list, establish data-communications connections for the set of the remote users subscribed to the particular meeting group by initiating an internet protocol connection, using the server and over the Internet, with at least one of the remote users subscribed to the particular meeting group, and merge the established data-communications connections for the set of the remote users for the meeting.

12. The system of claim 11, wherein the meeting board includes details, available to meeting participants, of a virtual meeting scheduled via the meeting board, and wherein the virtual meeting is set up to be conducted using the server and over the Internet.

13. The system of claim 11, wherein the meeting board includes details, available to meeting participants, concerning meetings and meeting groups for the participants to review.

14. The system of claim 11, wherein the server is to establish a sub-meeting of the meeting with a subset of the remote users during the meeting.

15. The system of claim 14, wherein the sub-meeting is set up to be visible as another meeting to the remaining set of remote users during the meeting.

16. The system of claim 11, wherein the server is to establish a private meeting with at least a subset of the remote users during the meeting, wherein the private meeting is not visible as another meeting to the remaining set of remote users during the meeting.

17. The system of claim 11, wherein the server is to provide a user interface for uploading data formatted to define meeting groups and associated participants.

18. The system of claim 11, wherein each of the set of remote users is subscribed to a particular meeting, and the server opens the meeting to the set of remote users subscribed to the particular meeting group to allow for feedback.

19. The system of claim 11, wherein each of the set of remote users as access to a particular meeting via a subscription via the server, and the server is to open the meeting by queuing the set of remote users subscribed to the particular meeting and to record input from at least one of the set of remote users.

* * * * *